(12) United States Patent
Park

(10) Patent No.: US 7,346,366 B2
(45) Date of Patent: Mar. 18, 2008

(54) MOBILE PHONE

(75) Inventor: Jun Won Park, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 270 days.

(21) Appl. No.: 10/186,794

(22) Filed: Jul. 1, 2002

(65) Prior Publication Data

US 2003/0003949 A1    Jan. 2, 2003

(30) Foreign Application Priority Data

Jul. 2, 2001    (KR)    ............... 10-2001-39273

(51) Int. Cl.
H04M 1/00    (2006.01)
H04B 1/38    (2006.01)

(52) U.S. Cl. ............... 455/550.1; 455/573; 455/575.1

(58) Field of Classification Search ............ 455/575.1, 455/90.3, 128, 347, 90; 379/419, 428.1, 379/446; 429/97, 96
See application file for complete search history.

(56) References Cited

U.S. PATENT DOCUMENTS

| 4,904,549 | A | * | 2/1990 | Goodwin et al. | ............ 429/97 |
| 5,308,716 | A | * | 5/1994 | Shababy et al. | ............ 429/97 |
| 5,396,162 | A | * | 3/1995 | Brilmyer | ............ 320/114 |
| 5,415,955 | A | * | 5/1995 | Kobayashi et al. | ............ 429/97 |
| 5,460,906 | A | * | 10/1995 | Leon et al. | ............ 429/97 |
| 5,535,437 | A | * | 7/1996 | Karl et al. | ............ 455/575.1 |
| 5,615,250 | A |  | 3/1997 | Kobayashi |  |
| 5,697,070 | A | * | 12/1997 | Liebler | ............ 455/575.1 |
| 5,818,701 | A | * | 10/1998 | Shindo | ............ 361/814 |
| 5,917,907 | A | * | 6/1999 | Kela | ............ 379/446 |
| 6,060,193 | A | * | 5/2000 | Remes et al. | ............ 429/96 |
| 6,490,436 | B1 | * | 12/2002 | Kaiwa et al. | ............ 455/90.1 |
| 6,665,544 | B1 | * | 12/2003 | Michel et al. | ............ 455/558 |
| 6,751,488 | B2 | * | 6/2004 | Lee | ............ 455/575.3 |
| 6,920,344 | B2 | * | 7/2005 | Jang | ............ 455/575.5 |
| 2002/0131584 | A1 | * | 9/2002 | Mote et al. | ............ 379/419 |
| 2003/0114203 | A1 | * | 6/2003 | Lee | ............ 455/572 |

FOREIGN PATENT DOCUMENTS

| EP | 0 892 447 A1 |  | 1/1999 |
| EP | 0 986 113 A1 |  | 3/2000 |
| EP | 0 986 232 A2 |  | 3/2000 |
| JP | 62-055119 |  | 4/1987 |
| JP | 06-060052 |  | 3/1994 |
| JP | 08-317024 |  | 11/1996 |
| JP | 09-147829 |  | 6/1997 |
| JP | 2000-511380 |  | 8/2000 |
| JP | 2001-035460 |  | 2/2001 |
| KR | 2002-006159 | * | 7/2000 |

* cited by examiner

Primary Examiner—Joseph Feild
Assistant Examiner—Kiet Doan
(74) Attorney, Agent, or Firm—Lee, Hong, Degerman, Kang & Schmadeka

(57) ABSTRACT

Mobile phone including a main body for fitting various operative components, a battery pack detachably fitted to the main body for supplying power, and a hook device at a side of the battery pack for decoupling the battery pack from the main body by pushing the hook device, thereby permitting an easy decoupling of the battery pack.

2 Claims, 6 Drawing Sheets

MOBILE PHONE

This application claims the benefit of the Korean Application No. P2001-39273, filed on Jul. 2, 2001, which is hereby incorporated by reference.

BACKGROUND OF THE INVENTION

1. Field of the Invention

The present invention relates to a mobile phone, and more particularly, to a structure for fitting a battery pack to a mobile phone.

2. Background of the Related Art

A related art mobile phone will be explained with reference to FIGS. 1 and 2. FIG. 1 illustrates a back view of a related art mobile phone.

Referring to FIG. 1, the related art mobile phone is provided with a main body 1, and a battery pack 5, wherein the main body 1 has a hook device 2 in an upper part thereof for fitting the battery pack 5 on a rear surface of the main body 1.

The battery pack 5 is coupled to the main body 1 by aligning a lower end of the battery pack 5 with a lower end of the main body 1, and pressing the battery pack 5 toward the main body 1. When the battery pack 5 is coupled to the main body, the hook device 2 presses the battery pack 5 elastically, to prevent the battery pack 5 from falling off the main body 1.

FIG. 2A illustrates a section showing a state the hook device fastens the battery pack in the related art mobile phone in FIG. 1, and FIG. 2B illustrates a section showing a state the hook device releases the battery pack in the related art mobile phone in FIG. 1.

Referring to FIG. 2A, the hook device 2 has an elastic member 4, and a hook 3, and the battery pack 5 has a hook recess 5a at a position opposite to the hook device 2 in an upper part of a length direction thereof.

The hook 3 has a fixing part 3a for fixing the hook 3 as the fixing part 3a is inserted into the elastic member 4, a pressure application part 3b exposed to exterior for the user to push up the hook device by a finger, and a hook head 3c for coupling with the hook recess 5a.

Therefore, once the hook 3 and the battery pack 4 are coupled, the hook 3 presses the battery pack 5 by a restoring force of the elastic member 4 and, on the same time with this, the hook head 3c is inserted into the hook recess 5a in the battery pack 5. Eventually, the hook 3 fastens the battery pack 5 to the main body.

In the meantime, when the battery is discharged as the battery pack 5 is fitted to the main body 1 of the mobile phone, and used for a predetermined time, it is required that the discharged battery pack 5 is removed from the main body, for fitting a new battery pack 5 thereto. A process for removing the battery pack 5 will be explained, with reference to FIG. 2B.

After the user holds the main body 1 of the mobile phone around the main body 1 by one hand, the user presses the pressure application part 3b on the hook upward by a thumb in a direction of an arrow in FIG. 2b, when the hook 3 presses the elastic member 4, and moves a predetermined distance backward by an external force, until the hook head 3c is released from the hook recess 5a in the battery pack 5. If the hook head 3c is released, the battery pack 5 is removed from the main body 1 by the other hand.

However, the related art structure for fitting the battery pack has inconvenience of requiring two hands in removal of the battery pack 5 since the user requires pushing the hook device 2 by a thumb of one hand, and removes the battery pack 5 by the other hand.

Moreover, the hook device 2 fitted in the upper part of the main body 1 imposes spatial restriction in fitting components inside of the main body, that in turn restricts designing the mobile phone to be smaller and thinner.

SUMMARY OF THE INVENTION

Accordingly, the present invention is directed to a mobile phone that substantially obviates one or more of the problems due to limitations and disadvantages of the related art.

An object of the present invention is to provide a mobile phone in which a battery pack can be removed easily.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the mobile phone includes a main body for fitting various operative components, a battery pack detachably fitted to the main body for supplying power, and a hook device at a side of the battery pack for decoupling the battery pack from the main body by pushing the hook device.

Preferably, the hook device is provided at a side part of the battery pack a thumb or a forefinger is placed thereon when the user holds the mobile phone.

Preferably, the hook device is provided both to left and right sides of the battery pack, and more preferably, the hook device is provided at side parts of the battery pack a thumb and a forefinger are placed thereon when the user holds the mobile phone.

More preferably, the hook device includes a hook to be inserted in a side part of the battery pack for being released from the main body when the hook is pushed, and locked at the main body when the pushing force is removed, and an elastic member to be inserted in the side part of the battery pack together with the hook, for elastically supporting the hook against the side part of the battery pack.

The hook includes a pushing part exposed to an outside of the side part of the battery pack for being pushed by a finger, an intermediate part extended from the pushing part along the side part of the battery pack, and a locking part on the intermediate part at a position a distance away from the pushing part having a locking part to be held by the main body. The hook may further include a pin for preventing the elastic member from falling off the hook.

Preferably, the side part of the battery pack includes a finger tip seat formed around the pushing part.

The locking part is held by angles formed on left/right rims of the body, and the angle is positioned at a part a distance away from the pushing part.

The angle is projected from the rim of the main body and has an end part bent inward of the main body, and actually includes a vertical part extended from the rim of the main body, and a horizontal part extended from the vertical part.

The angle is accommodated in a slot in the side part of the battery pack.

Preferably, the locking part has a curved, or sloped bottom.

Thus, the present invention permits a user to couple/decouple the battery pack conveniently, and an optimal design of the mobile phone.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
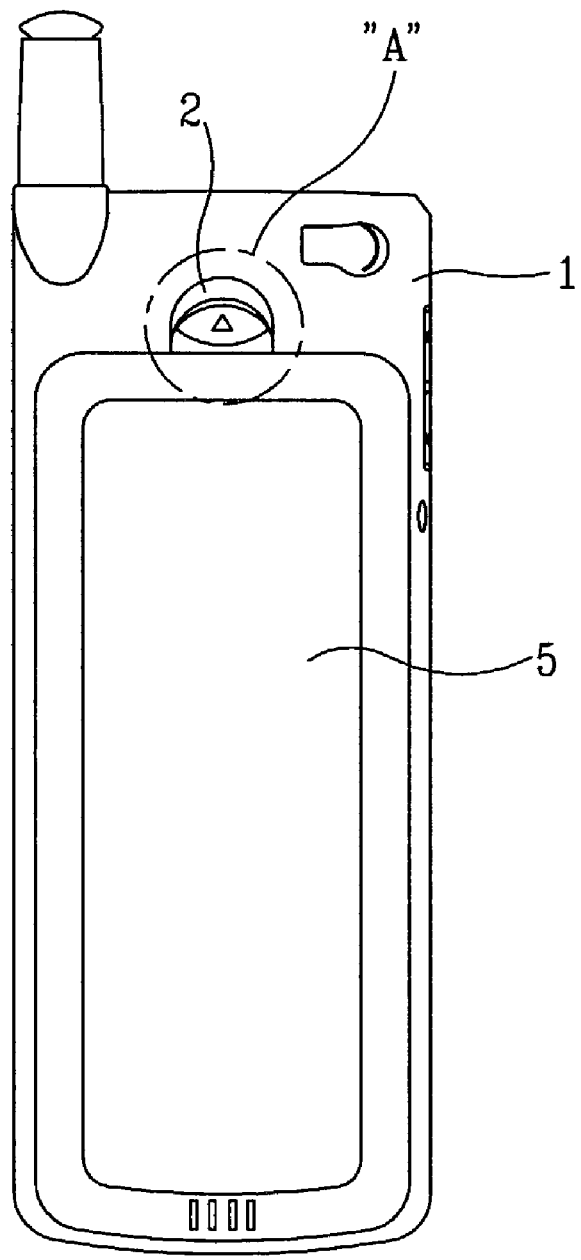
FIG. 1 illustrates a back view of a related art mobile phone.
Figure 2A:
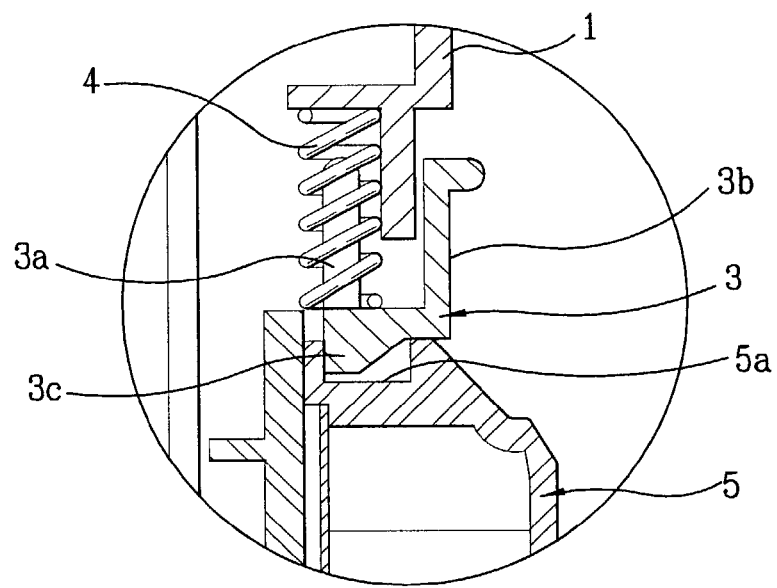
FIG. 2A illustrates a section showing a state the hook device fastens the battery pack in the related art mobile phone in FIG. 1.
Figure 2B:
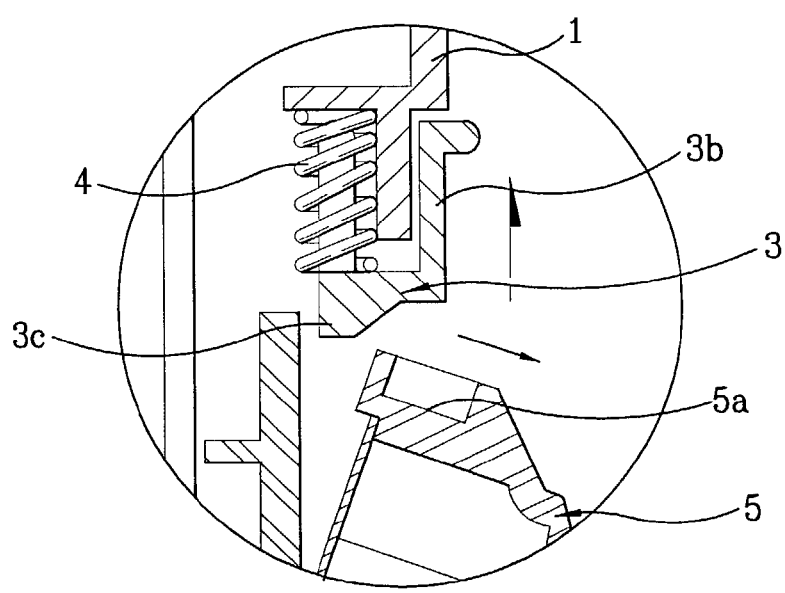
FIG. 2B illustrates a section showing a state the hook device releases the battery pack in the related art mobile phone in FIG. 1.
Figure 3:
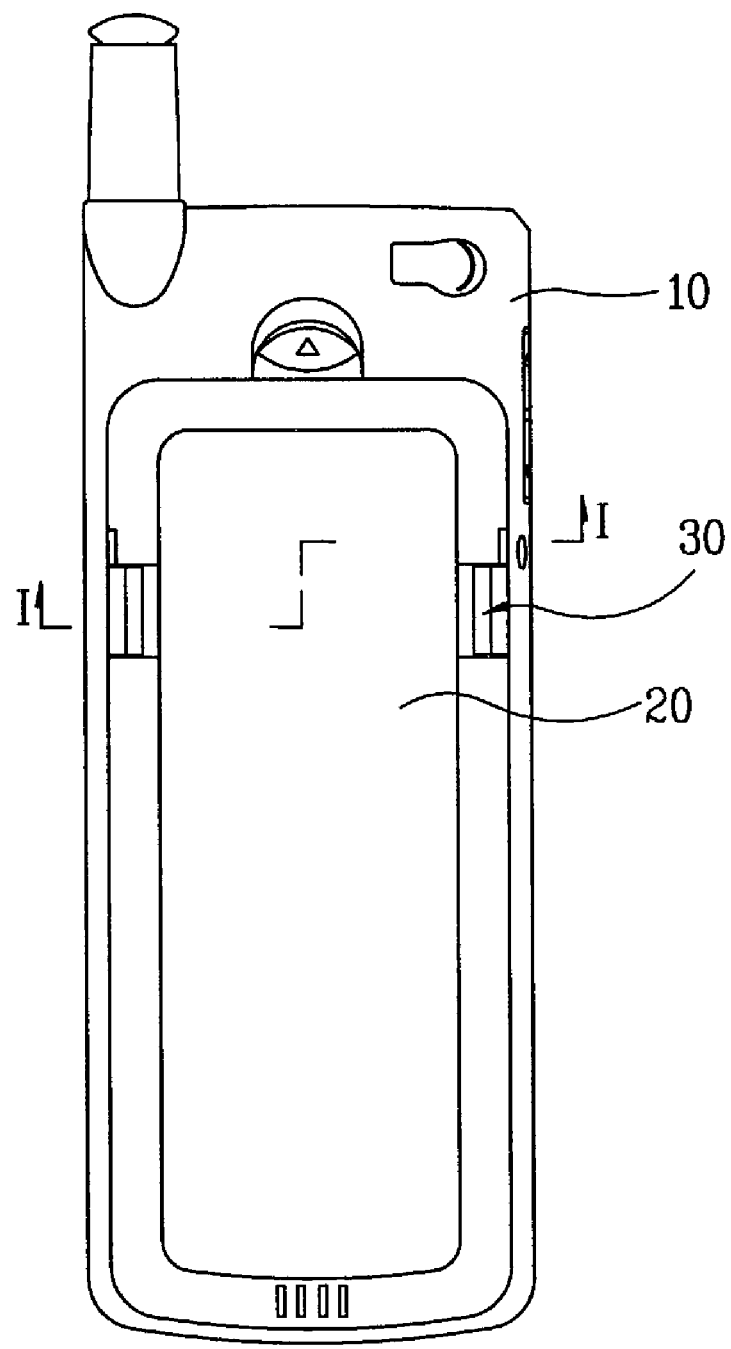
FIG. 3 illustrates a back view of a mobile phone in accordance with a preferred embodiment of the present invention.

Reference will now be made in detail to the preferred embodiments of the present invention, examples of which are illustrated in the accompanying drawings. FIG. 3 illustrates a back view of a mobile phone in accordance with a preferred embodiment of the present invention.

Referring to FIG. 3, the mobile phone includes a main body 10, a battery pack 20 for fitting to the main body 10, and a hook device 30 fitted to the battery pack 20.

The main body 10 includes main components of the mobile phone built therein, and a key pad and the like, required for operating the mobile phone. The battery pack 20 has a battery 21 (see FIG. 6) and a housing for holding the battery 21. As known, the battery pack 20 supplies power to the mobile phone, and detachably fitted to the main body 10 for replacement. Since the body 10, and the battery pack 20 are similar to general main body and battery pack, detailed explanation of which will be omitted, and the hook device 30 will be explained in detail.

Figure 4:
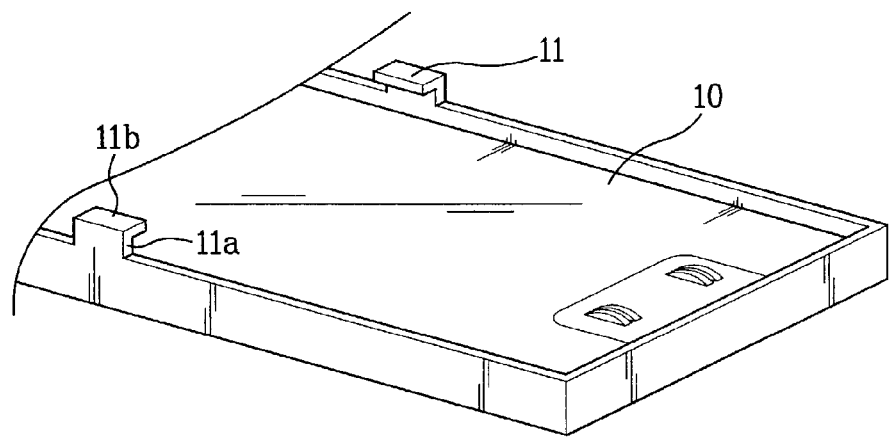
FIG. 4 illustrates a perspective view of a hook catch in a main body of a mobile phone in FIG. 3.
Figure 5:
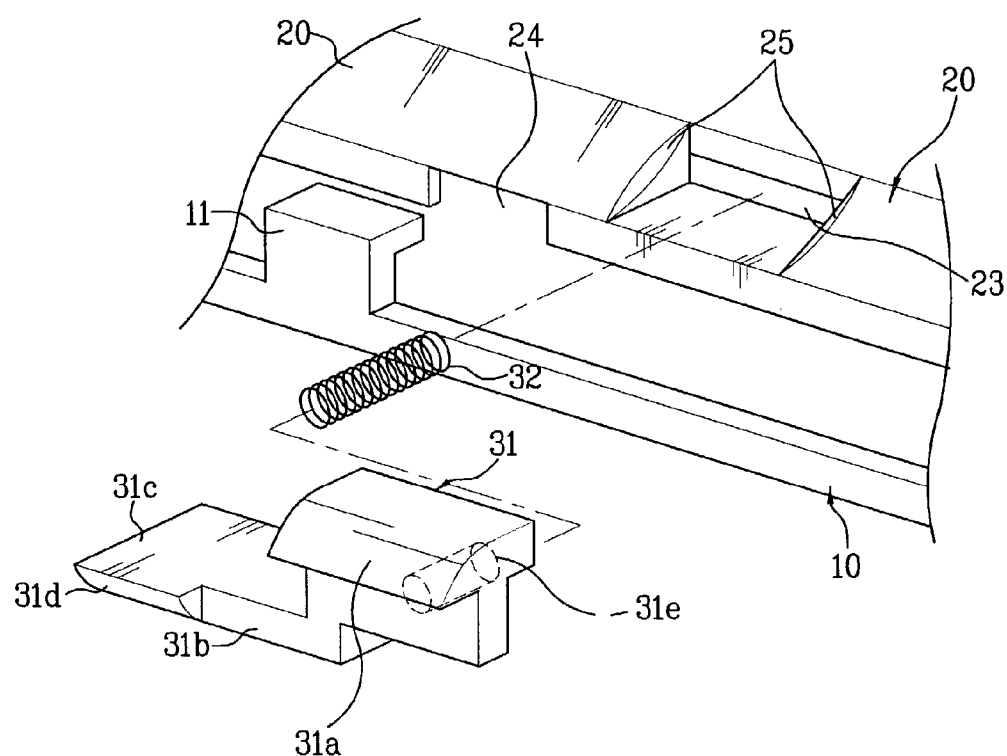
FIG. 5 illustrates a disassembled perspective view of a hook device for the mobile phone in FIG. 3.

FIG. 4 illustrates a perspective view of a hook catch in a main body of a mobile phone in FIG. 3, and FIG. 5 illustrates a disassembled perspective view of a hook device for the mobile phone in FIG. 3.

The hook device 30 is provided, not to the main body 10, but to sides of a battery pack 20, such that the battery pack 20 is separated from the main body 10 when an external force is applied thereto. That is, though the hook device on the main body fastens the battery pack in the related art mobile phone, a hook device 30 on a battery pack 20 is fastened in a main body 10 (more specifically, at sides of the main body 10) of a mobile phone of the present invention. Accordingly, in the mobile phone of the present invention, since the hook device 30 is provided at sides of the battery pack 20, a room space, the main body 10 can secure a relatively larger space.

Moreover, only one hook device 30 may be provided, and it is preferable that the hook device 30 is provided at a position of the sides of the battery pack 20 the thumb or the forefinger is placed when the user holds the mobile phone. Accordingly, the user can remove the battery pack 20 more conveniently. Or, the hook device 30 may be provided both on left and right sides of the battery pack 20, to allow the user to remove the battery pack 20 regardless of the side of hand that holds the mobile phone. Furthermore, if the hook devices 30 provided to sides are at positions the thumb and the forefinger are placed when the user holds the mobile phone, the user can operate the hook devices 20 more easily.

The hook device 30 will be explained in more detail.

Referring to FIG. 5, the hook device 30 includes a hook 31 inserted in a side part of the battery pack 20, and an elastic member 32 fitted to the side part of the battery pack 20 together with the hook 31. For stable operation, the hook 31 and the elastic member 32 are fitted in a space 22 (see FIG. 6) formed in the side part of the battery pack 20, actually.

The hook 31 has a pushing part 31a for being in contact with a user's finger, an intermediate part 31b extended a length from the pushing part 31a, and a locking part 31c on the intermediate part 31c.

The pushing part 31a, a kind of button for the user to push, is exposed to an outside of the battery pack 20 through a hole 23 in communication with the space 22. As shown in FIGS. 5 and 6, there may be a finger tip seat 25 in a side part of the battery pack 20 around the pushing part 31a. The finger tip seat 25 is a recess, for convenient, and positive push of the pushing part 31a by the user.

As shown, the intermediate part 31b is fitted inside of the battery pack 20 extended along a side of the battery pack 20. When the hook 31 has the locking part 31c right under the pushing part 31a, a side part structure of the battery pack 20 becomes complicate, and may reduce strength of the side part of the battery pack 20. Therefore, the intermediate part 31b is provided for positioning the locking part 31c away from the pushing part 31a.

As explained, the locking part 31c is formed at an end of the intermediate part 31b a distance away from the pushing part 31a projected from the intermediate part 31b so as to be locked by the main body 10. In the meantime, there are angles 11 each formed on left and right rims of the main body 10 of the mobile phone for holding the locking part 31c. That is, the angle 11 is formed at a position a distance away from the pushing part 31a opposite to the locking part 31c. The angle may be a slot of a size in the rim of the main body 10 for inserting the locking part 31c therein. However, as shown in FIG. 4, it is preferable that the angle is projected from the rim of the main body 10 and bent inward. That is, the angle 11 has a vertical part 11a extended from the rim 10 of the main body, and a horizontal part 11b extended form the vertical part 11a, to form an angle in overall. The angle, rather than the slot, can hold the locking part 31c more positively, facilitating stable fastening of the battery pack 20 to the main body. Moreover, it is preferable that there is a slot 24 in the side part of the battery pack 20 for accommodating the projected angle 11.

As shown in FIGS. 5 and 6, it is preferable that the locking part 31c has a curved, or sloped bottom 31d, for sliding of the locking part 31c into the angle 11, and easy insertion of the locking part 31c into the angle 11.

On the other hand, as generally shown, the elastic member 11 in the hook device 30 is a coil spring, for pushing the hook 31 within the space 22. Therefore, when the pushing force from the hook 31 is removed, the spring restores the hook 31 to an original position. For this elastic member 11, as shown in FIGS. 5 and 6, the hook 31 may further includes a pin 31e extended from the pushing part 31a. As the elastic member 32 is inserted in the pin 31e, the elastic member 32 can be stably held, without falling off the hook 31 during operation.

Figure 6A:
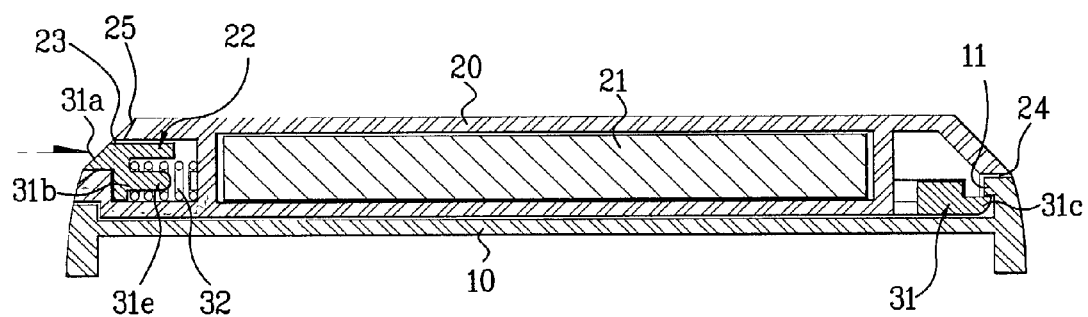
FIG. 6A illustrates a section across a line I-I in FIG. 3.
Figure 6B:
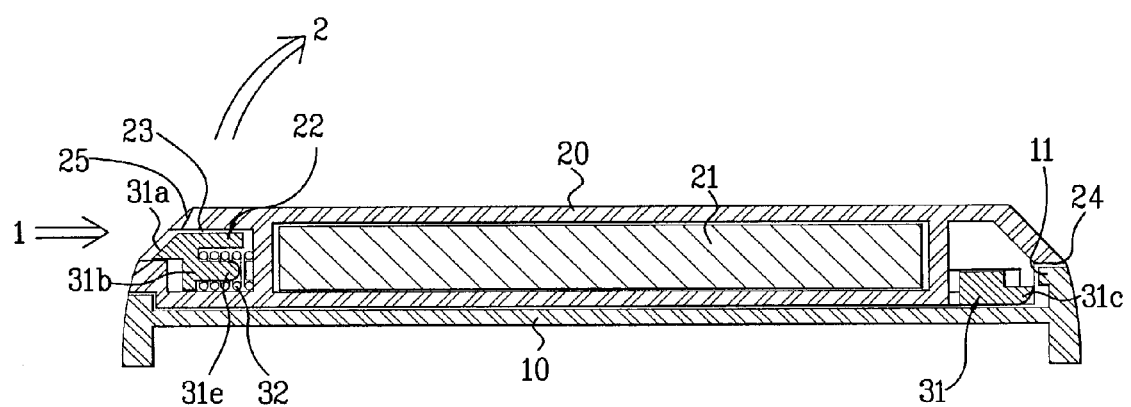
FIG. 6B illustrates a section showing a process a battery pack is removed from a main body of a mobile phone; and, FIG. 6C illustrates a section showing a state just before a battery pack is fitted to a main body of a mobile phone.
Figure 6C:
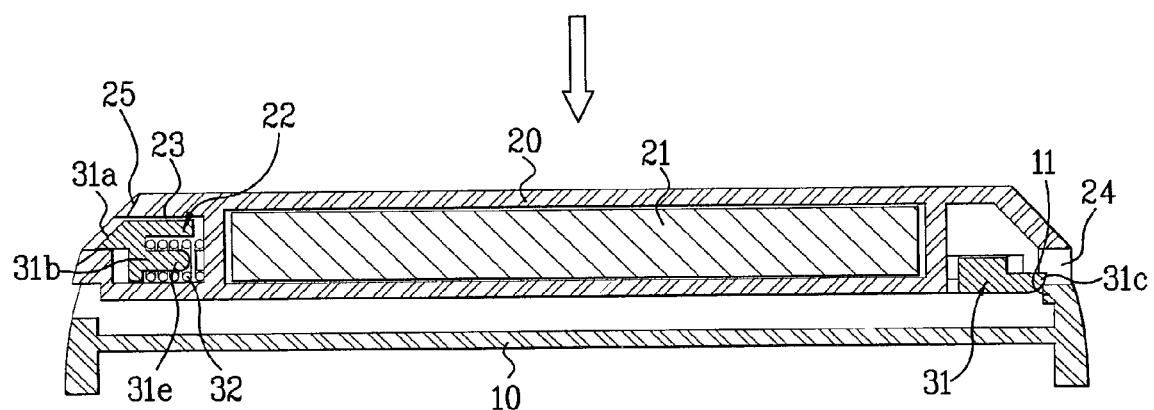

FIGS. 6A, 6B, and 6C respectively illustrate a state the battery pack 20 is coupled, and processes the battery pack 20 are decoupled/coupled. In FIGS. 6A-6C, left sides illustrate sections inclusive of the pushing part 31a, and right sides illustrate sections inclusive of the locking part 31c, referring to which the operation of the present invention will be explained.

Referring to FIG. 6A, the hook 31 is in a state pushed away to outside of the battery pack 20 by the elastic force of the elastic member 32, and the locking part 31c is inserted in, and held by the angle 11. In this instance, as a top surface of the locking part 31c and a bottom surface of the horizontal part 11b of the angle 11 are in contact, the battery pack 20 can be stably coupled to the main body 10.

When the mobile phone is used for a predetermined time period after the battery pack is fitted, it is required that the battery pack 20 is replaced a new one. A process for removing the battery pack 20 from the main body for replacement is shown in FIG. 6B.

Upon pushing the hook 31, the elastic member 32 is compressed, and the hook 31 moves inward to an inside of the battery pack 31. Consequently, the locking part 31c held by the angle 11 is released from the angle 11, and is ready to be separated from the main body 10.

Because the hook device 30 is provided in side parts of the battery pack 20, the user can decouple the battery pack 20 only with one hand. In detail, when only one hook device 30 is provided, the user can decouple the battery pack from the main body by pushing the pushing part 31a with a thumb of a forefinger in a state the mobile phone is placed on a palm in a direction of an arrow 1 to release the locking part 31a from the angle 11. Then, the user lifts the pushing part 31a in a direction of an arrow 2 while the pushing part 31a is pushed, to separate the battery pack 20 from the body 10. Also, in a case the hook device 30 is provided to both sides of the battery pack 20, the user can separate the battery pack 20 both with the thumb and the forefinger in the same method as explained before. In this instance, since the battery pack 20 is gripped by two fingers, a possibility of dropping the battery pack 20 is reduced. In conclusion, by using the thumb and/or the forefinger, the user can separate the battery pack 20, conveniently.

On the other hand, referring to FIG. 6C, when the battery pack 20 is fitted, the bottom 31d comes into contact with the angle 11, i.e., the horizontal part 11b. In this instance, when the battery pack 20 is pushed, the curved, or sloped bottom 31d slides on the horizontal part 11, and inserted into the angle 11 with easy. That is, when the user places the mobile phone on a palm, and pushes down a top part of the battery pack 20 with the thumb, the hook device 30 can be locked at the angle 11, automatically. Thus, the user can also couple the battery pack 20 only with one hand.

The advantages of the foregoing mobile phone of the present invention can be summarized as follows.

The provision of the hook device on the battery pack leaves a room space in the main body. By utilizing the room space, the mobile phone can be designed smaller.

The ergonomic provision of hook device at side parts of the battery pack so that the hook device can be pushed by thumb and the forefinger, the user can decouple the battery pack from the main body only with one hand. Moreover, since the bottom of the locking part is curved, or sloped, the user can couple the battery pack only with one hand. In conclusion, the present invention enhances convenience of the user, significantly.

It will be apparent to those skilled in the art that various modifications and variations can be made in the mobile phone of the present invention without departing from the spirit or scope of the invention. Thus, it is intended that the present invention cover the modifications and variations of this invention provided they come within the scope of the appended claims and their equivalents.

What is claimed is:

1. A mobile phone comprising:
a main body for housing a battery pack detachably fitted to the main body for supplying power; and
a hook device attached to the main body at a side of the battery pack for decoupling the battery pack from the main body upon a pushing force applied to the hook device, wherein the hook device directly contacts the battery pack, wherein the hook device comprises:
a hook to be inserted in a side part of the battery pack for being released from the main body when the hook is pushed, and is locked to the main body when the pushing force is removed from the hook device;
an elastic member inserted in the side part of the battery pack together with the hook, for elastically supporting the hook against the side part of the battery pack;
a pushing part exposed to an outside of a side part of the battery pack for being pushed;
an intermediate part extended from the pushing part along the side part of the battery pack; and
a locking part on the intermediate part and distal from the pushing part, wherein the locking part is held by the main body, wherein the locking part is held by angles formed on left/right rims of the body, and the locking part facilitates stable fastening of the battery pack to the main body, wherein the angle is projected from a rim of the main body and has an end part bent inward from the main body, and wherein the angle comprises a vertical part extended from the rim, and a horizontal part extended from the vertical part.

2. A mobile phone comprising:
a main body for housing a battery pack detachably fitted to the main body for supplying power; and
a hook device attached to the main body at a side of the battery pack for decoupling the battery pack from the main body upon a pushing force applied to the hook device, wherein the hook device directly contacts the battery pack, wherein the hook device comprises:
a hook to be inserted in a side part of the battery pack for being released from the main body when the hook is pushed, and is locked to the main body when the pushing force is removed from the hook device;

an elastic member inserted in the side part of the battery pack together with the hook, for elastically supporting the hook against the side part of the battery pack;

a pushing part exposed to an outside of a side part of the battery pack for being pushed;

an intermediate part extended from the pushing part along the side part of the battery pack; and a locking part on the intermediate part and distal from the pushing part, wherein the locking part is held by the main body, wherein the locking part is held by angles formed on left/right rims of the body, and the locking part facilitates stable fastening of the battery pack to the main body, wherein the angle is projected from a rim of the main body and has an end part bent inward from the main body, and wherein the angle is attached to the slot within the side part of the battery pack.

* * * * *